US012633681B2

(12) United States Patent
Watanabe

(10) Patent No.: US 12,633,681 B2
(45) Date of Patent: May 19, 2026

(54) CONNECTION STRUCTURE BETWEEN TERMINAL AND ELECTRIC WIRE

(71) Applicant: Yazaki Corporation, Tokyo (JP)

(72) Inventor: Kazuma Watanabe, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 349 days.

(21) Appl. No.: 18/521,350

(22) Filed: Nov. 28, 2023

(65) Prior Publication Data

US 2024/0178581 A1 May 30, 2024

(30) Foreign Application Priority Data

Nov. 29, 2022 (JP) ................................ 2022-189924

(51) Int. Cl.
*H01R 4/62* (2006.01)
*H01R 4/10* (2006.01)

(52) U.S. Cl.
CPC ................ *H01R 4/10* (2013.01); *H01R 4/62* (2013.01)

(58) Field of Classification Search
None
See application file for complete search history.

(56) References Cited

U.S. PATENT DOCUMENTS 10,797,457 B2 * 10/2020 Sato ...................... B23K 20/10
11,095,049 B2 * 8/2021 Kato .................... H01R 43/058
2012/0000069 A1 1/2012 Hagi et al.
2013/0233591 A1 * 9/2013 Terasaka ........... H01R 43/0207 174/117 R
2014/0311798 A1 10/2014 Numata et al.
2018/0197660 A1 7/2018 Nabeta et al.

FOREIGN PATENT DOCUMENTS

| | | | | | |
|---|---|---|---|---|---|
| CN | 103038955 | A | * | 4/2013 | ............. H01R 11/12 |
| DE | 102018220028 | A1 | * | 5/2019 | ............. H01R 4/184 |
| JP | 2010-251287 | A | | 11/2010 | |
| JP | 2013-058341 | A | | 3/2013 | |
| JP | 2014-211952 | A | | 11/2014 | |
| JP | 2018-113181 | A | | 7/2018 | |
| JP | 2022-86674 | A | | 6/2022 | |
| KR | 20120099128 | A | * | 9/2012 | ............. H01R 4/029 |
| WO | WO-2021241670 | A1 | * | 12/2021 | ............... H01R 4/62 |

* cited by examiner

*Primary Examiner* — Tho D Ta
(74) *Attorney, Agent, or Firm* — Sughrue Mion, PLLC

(57) ABSTRACT

A connection structure between a terminal and an electric wire includes: a terminal with a tubular shape continuously having an electric wire connection part with a bottomed tubular shape and an electrical contact part; and an electric wire having a plurality of core wires and an insulating sheath for coating the plurality of core wires, the plurality of core wires being exposed from the insulating sheath by peeling off the insulating sheath at an end part, and the plurality of core wires being inserted into the electric wire connection part and being press-fastened. The plurality of core wires exposed at the end part of the electric wire) are integrally joined to form a core wire bundle, and the core wire bundle is inserted into the electric wire connection part and is press-fastened.

6 Claims, 4 Drawing Sheets

CONNECTION STRUCTURE BETWEEN TERMINAL AND ELECTRIC WIRE

CROSS-REFERENCE TO RELATED APPLICATIONS

The present application is based on, and claims priority from Japanese Patent Application No. 2022-189924, filed on Nov. 29, 2022, the entire contents of which are incorporated herein by reference.

TECHNICAL FIELD

The present disclosure relates to a connection structure between a terminal and an electric wire.

BACKGROUND

PTL 1 (JP 2013-058341 A) discloses this kind of connection structure between a terminal and an electric wire. A connection structure between a terminal and an electric wire disclosed in PTL 1 includes a closed barrel type terminal, and an electric wire in which core wires constituted by a plurality of twisted strands are inserted into a cylindrical body part as a barrel part with one end of the terminal closed, the electric wire press-fastened the core wire into the body part. In the cylindrical body part, a core rod part extends from the closed end toward an opened end. Each core wire on the center side of the plurality of core wires adhere to a peripheral surface of the core rod part.

SUMMARY

In the connection structure between a terminal and an electric wire disclosed in PTL 1, since the number of the core wires increases as the size of the electric wire increases, it becomes more necessary to lower the resistance between the core wires, but there is a concern that the pressure for ensuring the conduction between the plurality of core wires becomes insufficient only by means of the core rod part disposed in the body part.

The present disclosure has been devised in view of this kind of problem of the background art. Further, an object of the present disclosure is to provide a connection structure between a terminal and an electric wire capable of enhancing the electrical performance between a terminal and an electric wire and enhancing the operability when an electric wire is inserted into a terminal.

A connection structure between a terminal and an electric wire according to an embodiment includes: a terminal with a tubular shape continuously having an electric wire connection part with a bottomed tubular shape and an electrical contact part; and an electric wire having a plurality of core wires and an insulating sheath for coating the plurality of core wires, the plurality of core wires being exposed from the insulating sheath by peeling off the insulating sheath at an end part, and the plurality of core wires being inserted into the electric wire connection part and being press-fastened, in which the plurality of core wires exposed at the end part of the electric wire are integrally joined to form a core wire bundle, and the core wire bundle is inserted into the electric wire connection part and is press-fastened.

According to the embodiment, it is possible to provide a connection structure between a terminal and an electric wire capable of enhancing the electrical performance between a terminal and an electric wire and enhancing the operability when an electric wire is inserted into a terminal.

DETAILED DESCRIPTION

Hereinafter, a connection structure between a terminal and an electric wire according to each embodiment will be described in detail with reference to the drawings.

First Embodiment

Figure 1:
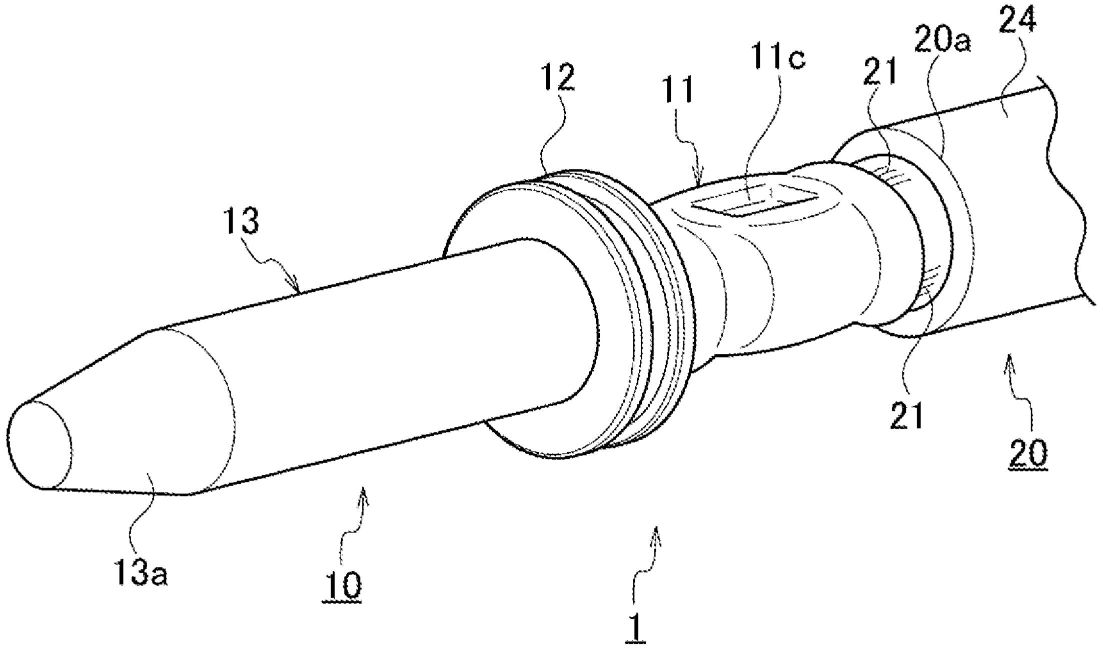
FIG. 1 is a perspective view illustrating an example of a connection structure between a terminal and an electric wire according to a first embodiment.
Figure 2:
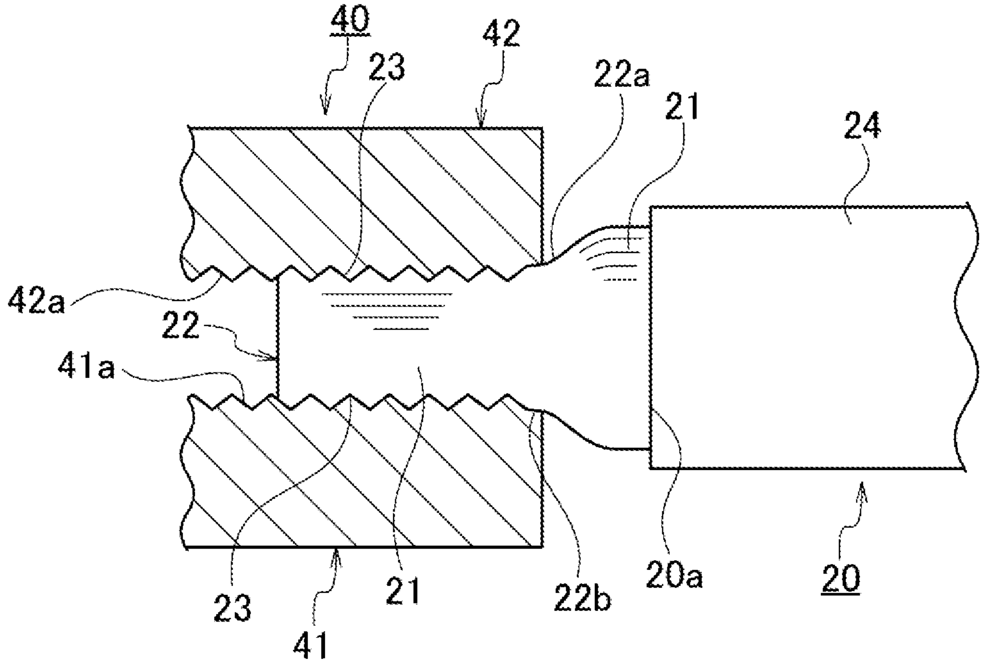
FIG. 2 is a cross-sectional view of a main part illustrating a state in which a plurality of core wires of an electric wire are ultrasonically joined to each other.
Figure 3:
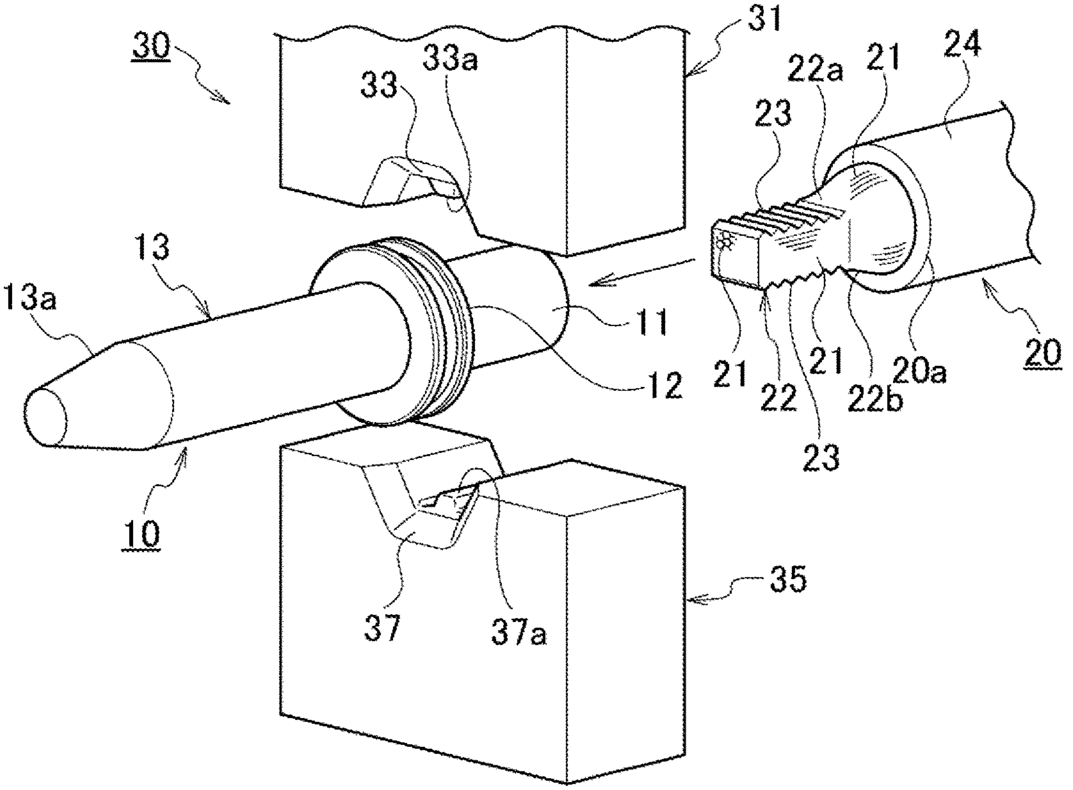
FIG. 3 is a perspective view illustrating a state before a core wire bundle of an electric wire is press-fastened to an electric wire connection part with a bottomed tubular shape of a terminal.
Figure 4:
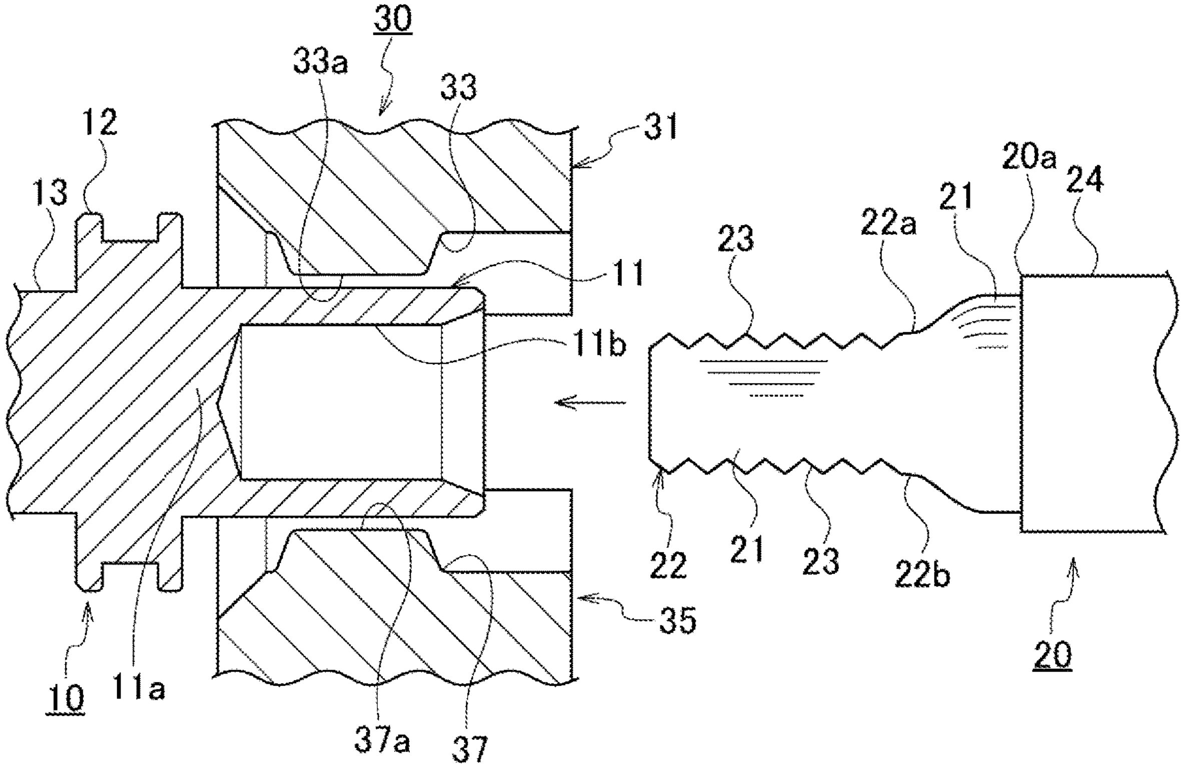
FIG. 4 is a cross-sectional view illustrating a state before a core wire bundle of an electric wire is press-fastened to an electric wire connection part with a bottomed tubular shape.
Figure 5:
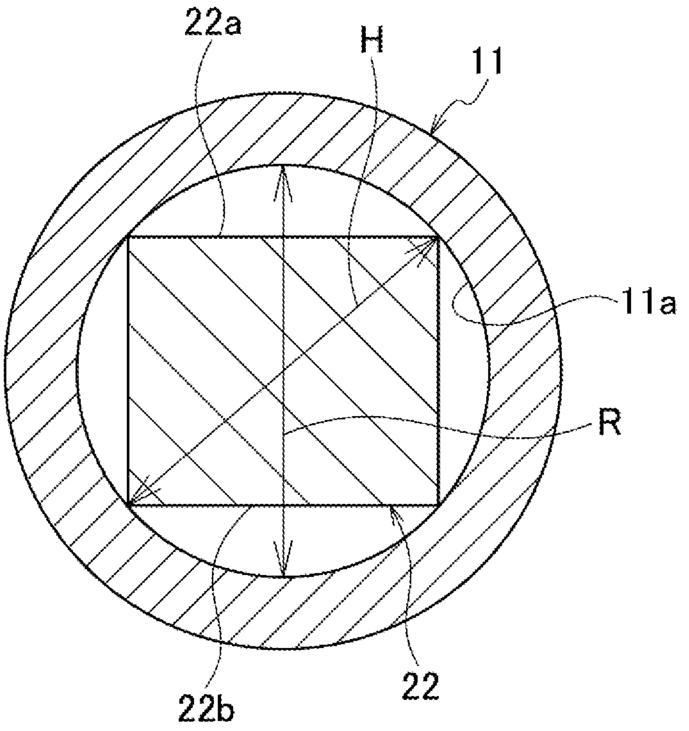
FIG. 5 is an explanatory diagram illustrating a dimensional relationship between an electric wire connection part with a bottomed tubular shape and a core wire bundle of an electric wire.

A connection structure 1 between a terminal and an electric wire according to a first embodiment will be described with reference to FIGS. 1 to 5. FIG. 1 is a perspective view illustrating an example of the connection structure 1 between a terminal and an electric wire according to the first embodiment. FIG. 2 is a cross-sectional view of a main part illustrating a state in which a plurality of core wires 21 of an electric wire 20 are ultrasonically joined to each other. FIG. 3 is a perspective view illustrating a state before a core wire bundle 22 of the electric wire 20 is press-fastened to an electric wire connection part 11 with a bottomed tubular shape of a terminal 10. FIG. 4 is a cross-sectional view illustrating a state before the core wire bundle 22 of the electric wire 20 is press-fastened to the electric wire connection part 11 with a bottomed tubular shape. FIG. 5 is an explanatory diagram illustrating the dimensional relationship between the electric wire connection part 11 with a bottomed tubular shape and the core wire bundle 22 of the electric wire 20.

As illustrated in FIG. 1, the connection structure 1 between a terminal and an electric wire includes the tubular terminal 10 continuously having the electric wire connection part 11 with a bottomed tubular shape and an electrical contact part 13 with a double annular flange 12 therebetween, and the electric wire 20 having the plurality of core wires 21 and an insulating sheath 24 for coating the plurality of core wires 21.

The tubular terminal 10 is a closed barrel type terminal, and by using a milling machine or the like, a predetermined conductive metal member is formed into the electric wire connection part 11 with a bottomed cylindrical shape and the pin-shaped electrical contact part 13 with the flange 12 therebetween. That is, the electric wire connection part 11 is formed in a bottomed cylindrical shape having a closing part 11*a* at one end and an opening 11*b* at the other end. Further, the electrical contact part 13 is formed in a pin shape (a bar shape) such that, for example, a cylindrical filling terminal (mating terminal) (not illustrated) is fitted and connected. The pin-shaped electrical contact part 13 has a conical surface 13*a* at a tip thereof so that the mating terminal is easily fitted.

The electric wire 20 is an aluminum electric wire in which core wires 21 which are constituted by a plurality of twisted strands made of aluminum or an aluminum alloy (hereinafter referred to as a plurality of core wires) are coated with the insulating sheath 24. Before the plurality of core wires 21 of the electric wire 20, that are exposed from the insulating sheath 24 by peeling off the insulating sheath 24 at an end part 20*a*, are inserted into the electric wire connection part 11 and are press-fastened, the plurality of core wires 21 are processed in advance into the core wire bundle 22 which is obtained by joining the core wires 21 by an ultrasonic joining apparatus 40 and integrating the core wires 21 (converting the core wires 21 into a single wire).

As illustrated in FIG. 2, the ultrasonic joining apparatus 40 includes a horn 41, an anvil 42, an anvil plate (not illustrated) arranged on the side of the horn 41, and a grinding jaw (not illustrated) arranged at a position which is on an upper surface of the horn 41 and faces the anvil plate. The anvil 42 moves in a direction toward or away from the horn 41, and the grinding jaw moves in a direction toward or away from the anvil plate. An ultrasonic vibration is applied to the plurality of core wires 21 while the plurality of core wires 21 are placed and pressurized in a joining processing chamber, which is a rectangular space in a cross-sectional view defined by the horn 41, the anvil 42, the anvil plate, and the grinding jaw, and accordingly the plurality of core wires 21 are joined to have a rectangular cross-section. Accordingly, as illustrated in FIGS. 3 and 4, the plurality of core wires 21 of the electric wire 20 exposed at the end part 20*a* become the core wire bundle 22 which is obtained by integrally joining the plurality of core wires 21 to have a rectangular cross-section. At the time of ultrasonic joining, serrated parts 23 are formed on an upper surface 22*a* and a lower surface 22*b* of the core wire bundle 22, which are outer surfaces in contact with the electric wire connection part 11 with a bottomed tubular shape. Further, as illustrated in FIG. 5, the core wire bundle 22 is formed such that the outermost length H of the diagonal line of the core wire bundle 22 having a rectangular cross-section is equal to or shorter than the diameter R inside the opening 11*b* of the electric wire connection part 11. In order to form the serrated parts 23 on the upper surface 22*a* and the lower surface 22*b* of the core wire bundle 22, serrated parts 41*a* are formed on an upper surface of the horn 41, and serrated parts 42*a* are formed on a lower surface of the anvil 42.

The core wire bundle 22 is press-fastened to the electric wire connection part 11 by a press-fastening device 30 illustrated in FIGS. 3 and 4.

As illustrated in FIGS. 3 and 4, the press-fastening device 30 includes an upper tool 31 having a press-fastening surface 33 near the lower surface thereof and a lower tool 35 having a press-fastening surface 37 near the upper surface thereof. A protrusion 33*a* is disposed in the center of the press-fastening surface 33 of the upper tool 31. A protrusion 37*a* is disposed in the center of the press-fastening surface 37 of the lower tool 35. The protrusions 33*a*, 37*a* form recesses 11*c* by pressing positions of the electric wire connection part 11 facing the protrusions 33*a*, 37*a* during press-fastening. That is, when the core wire bundle 22, which has been made into a single wire and made to have a rectangular cross-section, is inserted into the electric wire connection part 11, and the core wire bundle 22 and the electric wire connection part 11 are press-fastened between the upper tool 31 and the lower tool 35, the electric wire connection part 11 is press-fastened such that the center portions which are a part of the upper surface 22*a* and a part of the lower surface 22*b* of the core wire bundle 22 are recessed inwardly. Accordingly, the recesses 11*c* are formed at the positions of the electric wire connection part 11 facing each other.

In accordance with the connection structure 1 between a terminal and an electric wire according to the first embodiment described above, as illustrated in FIGS. 2 to 4, before the electric wire connection part 11 and the plurality of core wires 21 are press-fastened, the plurality of core wires 21 are converted into the core wire bundle 22 in advance which are obtained by integrating the plurality of core wires 21 (converting the core wires 21 into a single wire) by means of ultrasonic joining. By press-fastening the core wire bundle 22, which has been made into a single wire, to the electric wire connection part 11, conduction between the plurality of core wires 21 can be ensured, connection resistance between the terminal 10 and the electric wire 20 can be lowered, and accordingly electrical performance can be enhanced.

In addition, when the plurality of core wires 21 are converted into a single wire, as illustrated in FIG. 2, the serrated parts 23 that have been formed on the upper surface 22*a* and the lower surface 22*b* of the core wire bundle 22 extend during press-fastening, the breakage of an oxide film on the surface of the core wire bundle 22 is facilitated, and this can lower the connection resistance.

In addition, when the electric wire connection part 11 and the plurality of core wires 21 are press-fastened, the operability when the plurality of core wires 21 are inserted into the electric wire connection part 11 is enhanced by using the core wire bundle 22, which has been made into a single wire, such that the outermost length H of the diagonal line is equal to or shorter than the diameter R inside the electric wire connection part 11.

In addition, when the core wire bundle 22, which has been made into a single wire, is press-fastened to the electric wire connection part 11, the recesses 11*c* are formed at vertically facing positions of the electric wire connection part 11, and therefore both a core wire 21 located at the outer periphery of the core wire bundle 22 and a core wire 21 located at the center of the core wire bundle 22 substantially come into direct contact with the terminal 10. This enhances the electrical performance of the terminal 10 and the electric wire 20.

Second Embodiment

Figure 6:
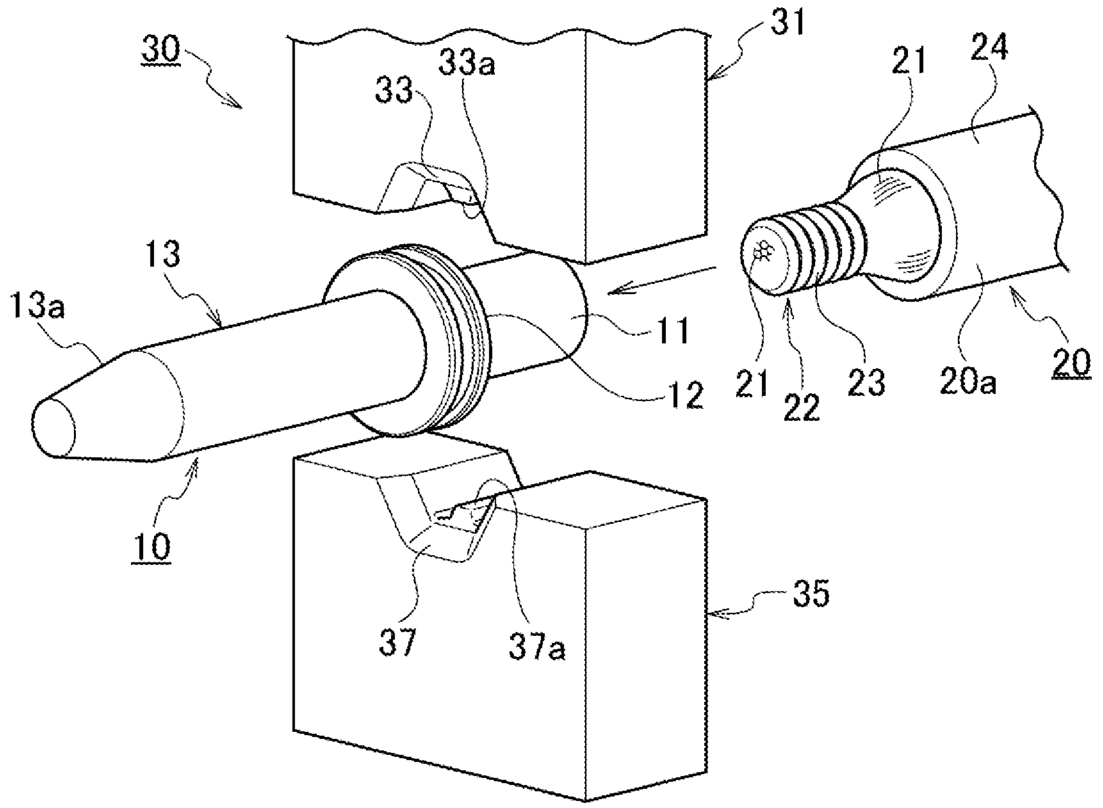
FIG. 6 is a perspective view illustrating a state before press-fastening a core wire bundle of an electric wire to an electric wire connection part with a bottomed tubular shape of a terminal in a connection structure between a terminal and an electric wire according to a second embodiment.
Figure 7:
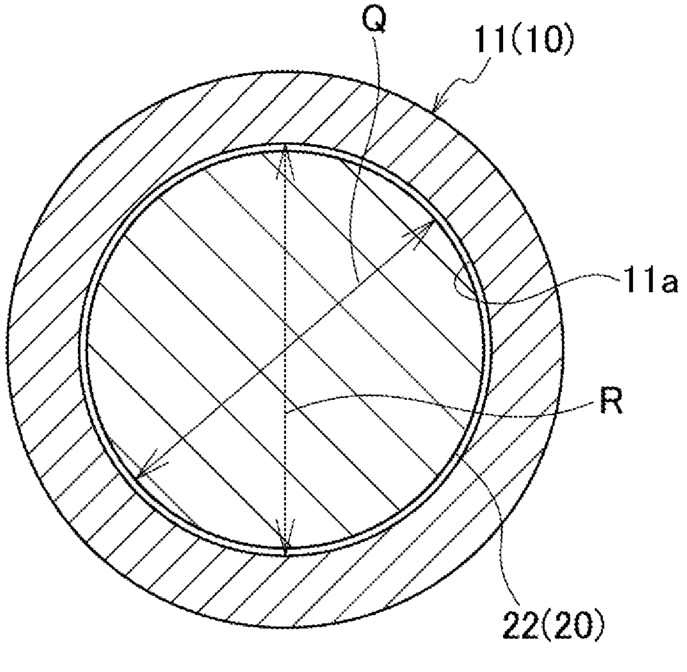
FIG. 7 is an explanatory diagram illustrating a dimensional relationship between the electric wire connection part with a bottomed tubular shape and the core wire bundle of the electric wire in the connection structure between a terminal and an electric wire according to the second embodiment.

With reference to FIGS. 6 and 7, a connection structure 1 between a terminal and an electric wire according to a second embodiment will be described. FIG. 6 is a perspective view illustrating a state before a core wire bundle 22 of an electric wire 20 is press-fastened to an electric wire connection part 11 with a bottomed tubular shape of a terminal 10 in the connection structure 1 between a terminal and an electric wire according to the second embodiment. FIG. 7 is an explanatory diagram illustrating a dimensional relationship between the electric wire connection part 11 with a bottomed tubular shape and the core wire bundle 22 of the electric wire 20.

The connection structure 1 between a terminal and an electric wire according to the second embodiment differs from that in the first embodiment in that the core wire bundle 22, which has been made into a single wire and made to have a circular cross-section (formed in a cylindrical shape), is inserted into the electric wire connection part 11 with a bottomed tubular shape, and the core wire bundle 22 and the electric wire connection part 11 are press-fastened between an upper tool 31 and a lower tool 35. Serrated parts 23 are formed on an outer peripheral surface which is an outer surface of the core wire bundle 22 having a circular cross-section. Since other configurations are the same as those of the first embodiment, the same parts are denoted with the same reference numerals, and a detailed description thereof will be omitted.

In the connection structure 1 between a terminal and an electric wire according to the second embodiment, when the electric wire connection part 11 and a plurality of core wires 21 are press-fastened, the core wire bundle 22 is used, which is formed to have a circular cross-section in which a diameter Q is equal to or shorter than a diameter R inside the electric wire connection part 11. By using the core wire bundle 22, which has been made into a single wire and made to have a circular cross-section, the operability when the core wires 21 are inserted into the electric wire connection part 11 can be further enhanced. Further, when the core wire bundle 22, which has been made into a single wire and made to have a circular cross-section, is press-fastened to the electric wire connection part 11, the core wire 21 located at the outer periphery of the core wire bundle 22 can be brought into contact with the terminal more reliably, and the electrical performance of the terminal 10 and the electric wire 20 can be further enhanced.

Although the embodiments have been described above, the embodiments are not limited thereto, and various modifications can be made within the scope of the gist of the embodiments.

That is, according to each embodiment, an aluminum electric wire is used as the electric wire 20, but a copper electric wire having a plurality of core wires which are made of copper or a copper alloy and are coated with an insulating sheath 24 may be used.

Further, according to each embodiment, the core wire bundle 22 is formed by integrally joining the plurality of core wires 21 by means of ultrasonic welding, but the core wire bundle 22 may be formed by integrally joining the plurality of core wires 21 by means of thermal welding or thermal crimping.

Further, according to each embodiment, the serrated parts 23 are formed on the outer surface of the core wire bundle 22 in contact with the electric wire connection part 11, but a plurality of pyramid-shaped protrusions may be formed on the outer surface of the core wire bundle 22 in contact with the electric wire connection part 11.

Further, according to the first embodiment, the serrated parts 23 are formed on the upper surface 22*a* and the lower surface 22*b* of the core wire bundle 22 having a rectangular cross-section, but the serrated parts 23 may also be formed on both side surfaces of the core wire bundle 22 having a rectangular cross-section.

Although some embodiments of the present invention have been described above, the embodiments have been presented as examples and are not intended to limit the scope of the present invention. The novel embodiments can be implemented in various other forms, and various omissions, substitutions, and modifications can be made without departing from the spirit of the invention. The embodiments and variations thereof are included in the scope and the gist of the present invention, and are also included in the scope of the invention and the equivalent scope of the invention recited in the claims.

The invention claimed is:

1. A connection structure between a terminal and an electric wire comprising:

a terminal with a tubular shape continuously having an electric wire connection part with a bottomed tubular shape and an electrical contact part; and an electric wire having a plurality of core wires and an insulating sheath for coating the plurality of core wires, the plurality of core wires being exposed from the insulating sheath by peeling off the insulating sheath at an end part, and the plurality of core wires being inserted into the electric wire connection part and being press-fastened, wherein the plurality of core wires exposed at the end part of the electric wire are integrally joined to form a core wire bundle, a serrated part is formed on an outer surface of the core wire bundle in contact with the electric wire connection part, and the core wire bundle is inserted into the electric wire connection part and is press-fastened.

2. The connection structure according to claim 1, wherein the plurality of core wires exposed at the end part of the electric wire are integrally joined to form the core wire bundle having a rectangular cross-section.

3. The connection structure according to claim 2, wherein the electric wire connection part is formed to have a bottomed cylindrical shape, and an outermost length of a diagonal line of the core wire bundle having the rectangular cross-section is equal to or shorter than a diameter inside the electric wire connection part.

4. The connection structure according to claim 2, wherein recesses are formed at positions of the electric wire connection part which face each other, and when the core wire bundle, which has been joined to have the rectangular cross-section, is inserted into the electric wire connection part and the core wire bundle and the electric wire connection part are press-fastened, the electric wire connection part having the recesses is press-fastened such that at least a part of an upper surface and a part of a lower surface of the core wire bundle are recessed inwardly.

5. The connection structure according to claim 1, wherein the plurality of core wires exposed at the end part of the electric wire are integrally joined to form the core wire bundle having a circular cross-section.

6. The connection structure according to claim 5, wherein the electric wire connection part is formed to have the bottomed cylindrical shape, and a diameter of the core wire bundle is equal to or shorter than a diameter inside the electric wire connection part.

* * * * *